Sept. 13, 1966 L. W. WARD 3,272,169
PASSIVE SHIP STABILIZER USING TERMINAL DAMPING MEANS
Filed July 30, 1964 3 Sheets-Sheet 1
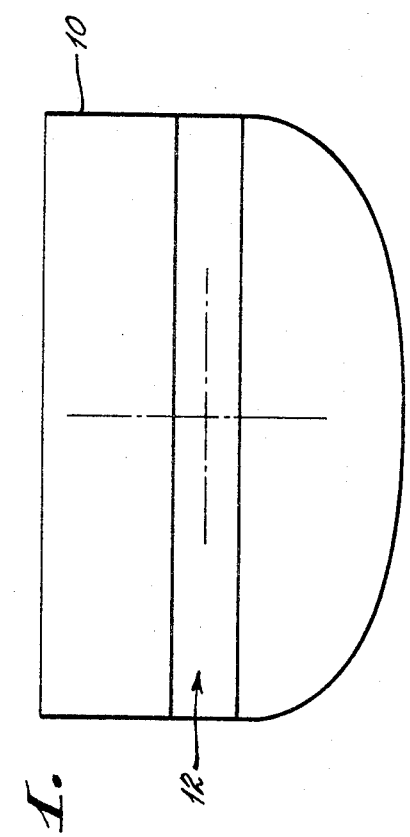
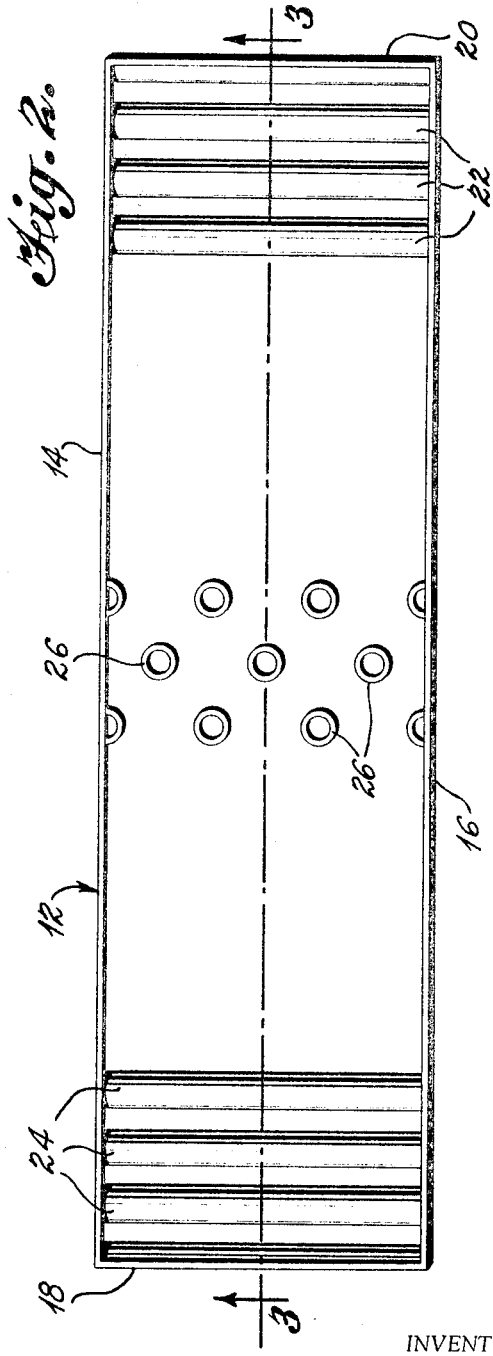
INVENTOR
Lawrence W. Ward
BY Stevens, Davis, Miller & Mosher
ATTORNEYS

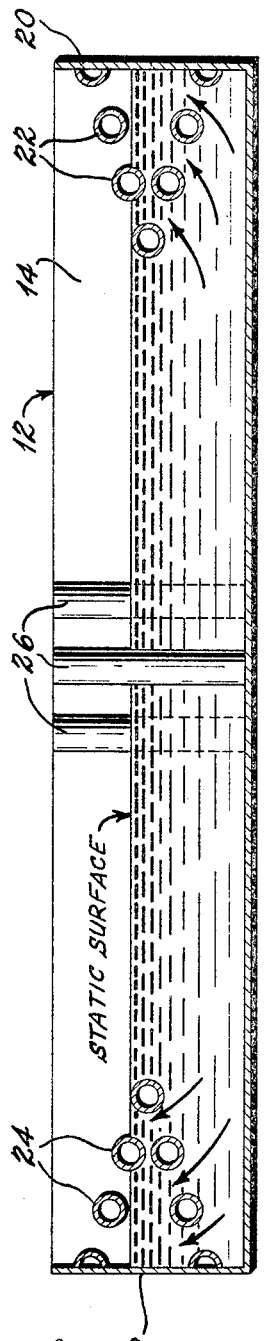
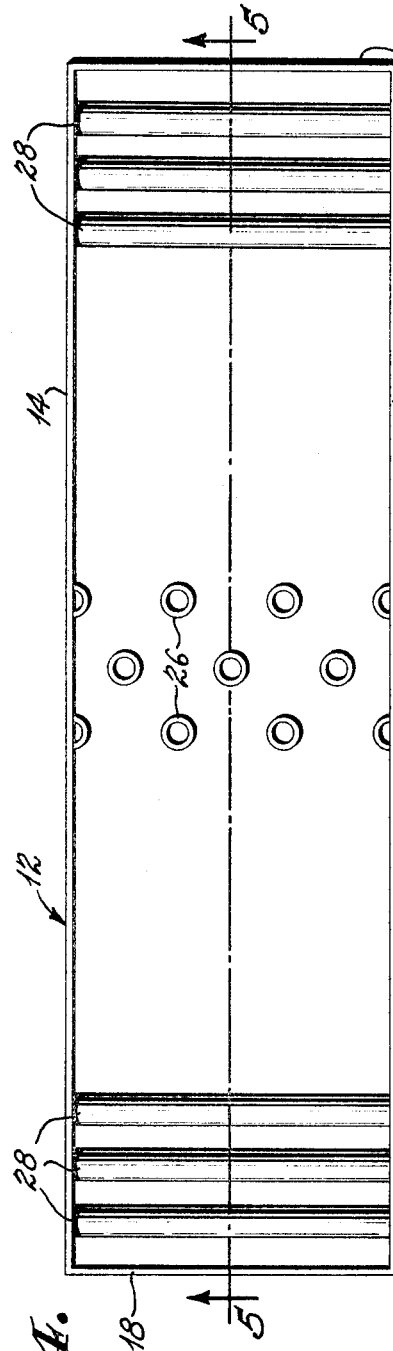
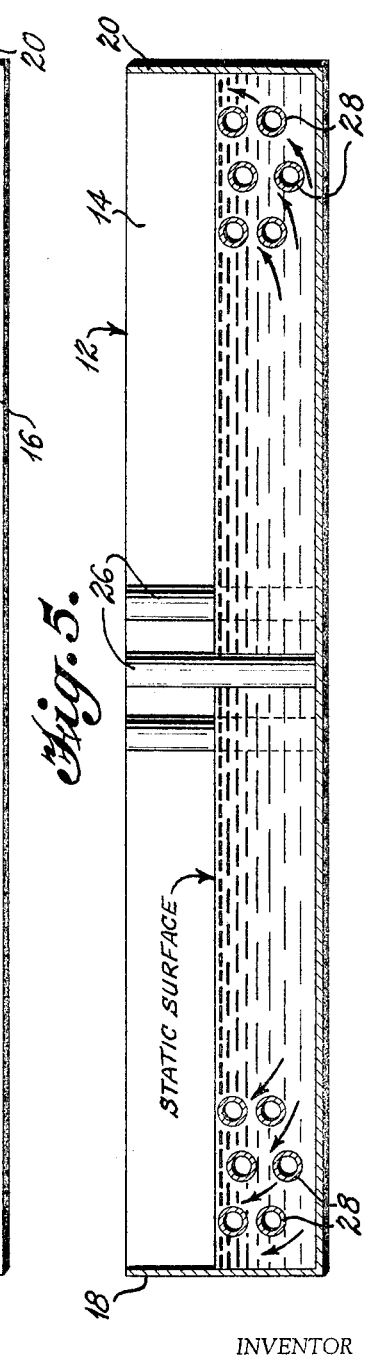

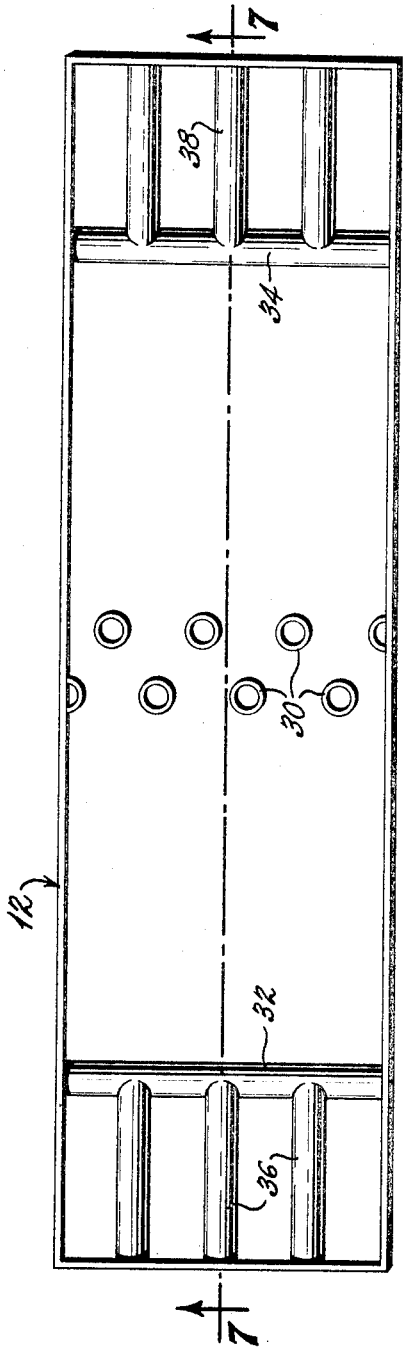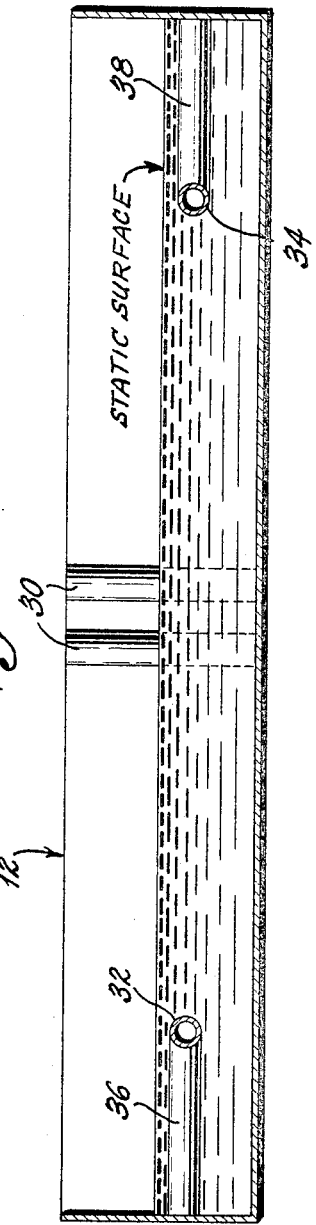

United States Patent Office 3,272,169
Patented Sept. 13, 1966

3,272,169
PASSIVE SHIP STABILIZER USING TERMINAL DAMPING MEANS
Lawrence W. Ward, Glen Cove, N.Y., assignor to John J. McMullen Associates, Incorporated, New York, N.Y., a corporation of New York
Filed July 30, 1964, Ser. No. 386,198
11 Claims. (Cl. 114—125)

This invention relates to a passive ship stabilization system and more particularly a passive ship stabilization system using energy dissipating means mounted at the center and terminal ends of said system for damping the kinetic energy of moving fluid therein.

It is an object of the present invention to provide an elongated liquid containing means which stores a liquid in such a manner as to allow liquid to transfer from one end thereof to the other in response to the rolling of the ship whereby a stabilizing moment is imparted to the ship.

It is a further object of the present invention to incorporate liquid energy damping means at the ends of said liquid containing means.

It is a further object of the present invention to provide a plurality of horizontally arranged pipes or the like at the end of the liquid containing means for the purpose of damping the kinetic energy of liquid moving therebetween.

It is still a further object of the present invention to incorporate a plurality of horizontally arranged pipes or the like arranged in ladder configuration to dampen the kinetic energy of moving fluid at the ends of said liquid containing means.

It is yet a further object of the present invention to provide, in some cases, a plurality of vertically upstanding pipes or the like located at the center of said liquid containing means for the purpose of damping the energy of transferring fluid therethrough without substantially decreasing the velocity of said transferring liquid.

Other and further objects of the present invention will become apparent with the following detailed description in view of the appended drawings in which:

FIG. 1 is a schematic representation of a hull of a water going vessel showing one possible location of the passive ship stabilizer mounted therein;

FIG. 2 is a top plan view of one embodiment of the present invention with the top of the tank removed for the purpose of clarity;

FIG. 3 is a sectional view taken along line 3—3 of FIG. 2;

FIG. 4 is a top plan view of another embodiment of the present invention;

FIG. 5 is a sectional view taken along line 5—5 of FIG. 4;

FIG. 6 is a top plan view of still another embodiment of the present invention; and FIG. 7 is a sectional view taken along line 7—7 of FIG. 6.

Referring now to FIG. 1 of the drawings, there is illustrated a ship's hull 10 with a passive stabilization system generally indicated as 12 mounted between two decks thereof. The stabilization system can comprise a plurality of side plates and end plates mounted or welded between two existing decks of the ship 10 so that the upper deck will act as a top and the lower deck will act as a bottom for the passive stabilization system. A body of liquid is disposed throughout said stabilization system or liquid storage tank 12, and said body of liquid transfers from one end of said tank 12 to the other in response to the roll of the ship. The geometry of the tank and the liquid mass are such that the natural period of the tank liquid is tuned to the natural period of roll of the ship and 90° out of phase so that the proper stabilizing moment can be imparted to the ship.

Referring now to FIGS. 2 and 3, there is illustrated one embodiment of the present invention. Tank 12 is comprised of two side plates 14 and 16 and two end plates 18 and 20. The tank has a longitudinal axis which is disposed substantially athwartship as can be seen in FIG. 1 and has a longitudinal dimension substantially greater than any lateral dimension thereof.

A plurality of small diametered pipes 22 are mounted in the respective side plates 14 and 16 and extend laterally and horizontally across one end of tank 12. The outer surfaces of at least some of the pipes 22 are continuous about each respective axis thereof and are spaced from all other structures in the tank. In this embodiment, the disposition of said pipes 22 is such as to form a substantially V-shaped configuration in cross section or profile. A similar set of pipes 24 is horizontally mounted at the other end of said tank 12 and is also spaced vertically and diagonally with respect to each other to form a V-shaped configuration when viewed in section.

Another plurality of pipes 26 are mounted from the top to bottom at the center of tank 12 and form three staggered rows disposed laterally across tank 12.

The diameters of pipes 22, 24 and 26 are small and do not choke off or greatly throttle the transfer of liquid passing therebetween. With this construction, the velocity of transferring fluid is not greatly reduced but yet a substantial amount of kinetic energy is dissipated due to the scrubbing or friction imparted to the transferring fluid by the stationary pipes. This phenomenon can be accounted for by recognizing the fact that energy damping is proportional to the square of the velocity of the transferring fluid. With the low throttling action of the small pipes, substantially no local potential head is created. Therefore, the fluid motion impedance provided by pipes 26 at the center of said tank 12 is enhanced by the screen effect, friction, and tortuous flow caused by their particular arrangement.

As the liquid tends to build up at one end of the tank 12, its velocity component changes direction from horizontal to vertical. Hence, the liquid flows vertically through horizontally disposed pipes 22 or 24, and these obstructions will also dampen the kinetic energy thereof.

The V-shaped profile for the disposition of pipes 22 and 24 functions to dampen energy of the horizontal component of moving liquid at the ends of the tank 12 as well as the vertical component of moving liquid thereat. Therefore, this design is particularly good for ships which can anticipate experiencing great degrees of roll.

The fluid to be employed within the stabilizer can be any liquid or the like having sufficient density and with a viscosity of a sufficiently low magnitude so that flow can readily take place between pipes 26 and pipes 22 and 24. Liquids such as sea water, fresh water, bunker oil or types of liquid cargo can be used in the stabilizer tank. Once the stabilizer has been designed and installed within the ship, the depth of fluid within the stabilizer can be varied to tune the stabilizer to various conditions of the ship and sea.

Vertical pipes 26 also function to prevent great surges of fluid transfer in response to violent rolling of the ship and to dissipate energy of transferring liquid. If desired, pipes 22 and 24 can be disposed entirely below the static surface level of the fluid within tank 12 without departing from the spirit of the present invention.

The operation of the present invention will now be described. Let it be assumed that the conditions of the sea are such to roll ship 10 about its axis of roll to establish a liquid transfer within stabilizer tank 12. As a rolling force is applied to ship 10 to lower the left side thereof as seen in FIG. 1, a fluid transfer will take place from the right side to the left side of tank 12 as seen in FIG. 3.

As the fluid mass transfers through vertically disposed pipes 26, said fluid takes a tortuous path therethrough and said pipes 26 impart fluid resistance and friction to the moving liquid. This reduces to some extent the energy content of the transferring liquid but the velocity of transferring liquid is not reduced to any great extent. As the fluid mass arrives at the left side of the tank 12, the fluid accumulates thereat and assumes a vertical path through the horizontally disposed pipes 24. By this time the left side of ship 10 has reached its maximum negative roll condition and has returned to the horizontal and is attempting to rise and roll in the other direction. The accumulation of fluid mass at the left side of tank 12 opposes this rise of the left side of ship 10 so that roll stabilization forces are imparted to the ship.

Some of the kinetic energy of liquid arriving at left side of tank 12 is dissipated as said fluid passes vertically through horizontally disposed pipes 24 and the remainder of said kinetic energy is transformed into potential energy.

As the left side of ship 10 continues to rise above the horizontal, the fluid mass at the left side of tank 12 is given a greater potential energy so that a hydrostatic head is formed thereat. The fluid mass then begins to transfer toward the right side of tank 12, again passing through pipes 26 which dissipates substantial amounts of energy, but does not greatly reduce the velocity of transferring fluid, and said fluid mass accumulates at the right side of tank 12. The accumulation of said fluid mass again rises vertically through pipes 24, 22 and a substantial amount of kinetic energy is dissipated thereby. By this time the right side of ship 10 has gone through its lowermost position and returned to the horizontal and begins to rise, the rising thereof being opposed by the great mass of fluid at the right side of tank 12.

Thus, it can be seen that stabilization forces are imparted to the ship in opposition to the roll thereof. The energy and external forces imparted to the ship by the sea are dissipated and sufficiently controlled by the kinetic energy damping means, which in this case comprises vertical pipes 26 and horizontally arranged pipes 22 and 24. Therefore, the roll of the ship is in balance with the natural period of the passive stabilizer and the external energy imparted to the ship is dissipated by said stabilizer.

Referring now to the embodiment of the invention shown in FIGS. 4 and 5, there is illustrated a liquid storage means 12 again having a body of the liquid therein. Two staggered rows of three horizontally disposed pipes 28 are mounted in the sides of said container 10, said pipes also having a small diameter and disposed beneath the static surface level of the body of fluid. Although the pipes 28 are disposed in two staggered rows if desired, their arrangement may be even. The operation of the system shown in FIGS. 4 and 5 is substantially the same as that shown in FIGS. 2 and 3.

Referring now to the embodiment shown in FIGS. 6 and 7, there is shown an elongated tank 12 having two rows of vertically disposed and staggered pipes 30 arranged laterally across the center thereof. If desired, more than two rows of pipes 30 can be mounted within tank 12, depending upon the anticipated rolling characteristics of the ship.

Two horizontally disposed pipes 32 and 34 mounted transversely across said tank 12 are mounted in the sides thereof. The horizontal pipes 32 and 34 are used to support respective pluralities of horizontal pipes 36 and 38, each of which have one end mounted to pipes 32 and 34, respectively, and the other end thereof mounted in the respective end plates of the tank 12. Therefore, the pipe arrangements 32, 36 and 34, 38 form a pair of ladder configurations mounted at respective ends of tank stabilizer 12. The plane of the ladder is disposed in a horizontal plane or a plane parallel to the horizontal surfaces of tank 12. Again, a body of liquid is disposed in tank 12 and has a static liquid surface just above the vertical location of the ladder arrangements 32, 36 and 34, 38.

The operation of the embodiment shown in FIGS. 6 and 7 is substantially the same as that described above. When the moving liquid mass arrives at either end of tank stabilizer 12, it assumes a vertical direction and the horizontally disposed ladder arrangements 32, 36 and 34, 38 impart a resistance to the vertically moving fluid therethrough.

Although the present invention has been shown and described with the terminal damping arrangements being used with the central damping arrangement and vice versa, the use of either arrangement independently is not precluded as such use may be indicated in the formulation of a particular design.

It is to be understood that the small diameter pipes disclosed herein are shown merely by way of example and a plurality of flat bars or rods can be used in place thereof without departing from the spirit of the present invention. Other and further modifications of the present invention can be made without departing from the spirit and scope of the present invention.

What is claimed is:

1. A ship stabilizer comprising an elongated tank mounted in a ship with its long axis transverse to the roll axis of the ship, a liquid body partially filling said tank, a plurality of elongated members mounted in said tank at each of the longitudinal end regions thereof, each of said plurality of members being arranged in a substantially horizontal plane, a portion of the outer surface of each of said members being continuous around the axis thereof and being spaced from the sides and ends of said tank and from the others of said plurality of members, whereby a portion of said liquid body transfers in said tank and passes upwardly through the spaces between said members in response to the roll of said ship.

2. A stabilizer set forth in claim 1 wherein at least one of said elongated members extends from one side of said tank to the other at a location spaced from its adjacent tank end.

3. A stabilizer set forth in claim 2 wherein the others of said plurality of members extend from one side of said tank to the other and are spaced vertically and horizontally from each other.

4. A stabilizer set forth in claim 3 wherein said plurality of members is aligned in a V with the apex pointing inboard.

5. A stabilizer set forth in claim 3 wherein said plurality of members are aligned in random fashion.

6. A stabilizer set forth in claim 2 wherein said plurality of members is arranged in a ladder configuration.

7. A stabilizer set forth in claim 6 wherein the ladder arrangement is positioned generally in a horizontal plane.

8. A stabilizer set forth in claim 2 wherein a plurality of vertically extending members are mounted on the bottom of said tank in the central portion thereof, said vertical members being generally aligned across the center portion of said tank.

9. A stabilizer set forth in claim 8 wherein said horizontal and vertical elongated members are hollow pipes.

10. A stabilizer set forth in claim 2 wherein each said member has a small cross sectional area so that the plurality of members as a group imparts substantially no back pressure head to the transferring liquid.

11. A stabilizer set forth in claim 9 wherein each said pipe has a small cross sectional area so that the vertical and horizontal pipes impart substantially no back pressure head to the transferring liquid.

References Cited by the Examiner

UNITED STATES PATENTS

| | | | |
|---|---|---|---|
| 3,083,673 | 4/1963 | Ripley | 114—125 |
| 3,083,674 | 4/1963 | Ripley | 114—125 |

MILTON BUCHLER, *Primary Examiner.*

T. M. BLIX, *Assistant Examiner.*